US008545598B2

(12) United States Patent
Cochran et al.

(10) Patent No.: US 8,545,598 B2
(45) Date of Patent: Oct. 1, 2013

(54) MERCURY REMOVAL SYSTEMS USING BENEFICIATED FLY ASH PARTICLES AND METHODS THEREOF

(75) Inventors: Joseph W. Cochran, Palm Harbor, FL (US); S. Frank Kirkconnell, St. Petersburg, FL (US); Vincent M. Giampa, Apollo Beach, FL (US)

(73) Assignee: PMI Ash Technologies, LLC, Cary, NC (US)

( * ) Notice: Subject to any disclaimer, the term of this patent is extended or adjusted under 35 U.S.C. 154(b) by 1355 days.

(21) Appl. No.: 11/820,380

(22) Filed: Jun. 19, 2007

(65) Prior Publication Data
US 2008/0314242 A1    Dec. 25, 2008

(51) Int. Cl.
*B01D 46/46*    (2006.01)

(52) U.S. Cl.
USPC ............... 95/1; 95/107; 95/134; 96/373

(58) Field of Classification Search
USPC ................... 95/1, 107, 134; 96/373
See application file for complete search history.

(56) References Cited

U.S. PATENT DOCUMENTS

| 2,546,570 | A | 3/1951 | Vance |
| 2,576,565 | A | 11/1951 | Brown |
| 3,328,180 | A | 6/1967 | Ban |
| 3,799,474 | A | 3/1974 | Scharzler |
| 3,825,501 | A | 7/1974 | Muenger |
| 3,979,168 | A | 9/1976 | Chauvin |
| 4,003,986 | A | 1/1977 | Lewis, Jr. |
| 4,034,063 | A | 7/1977 | Rosar et al. |
| 4,043,831 | A | 8/1977 | Friedman |
| 4,064,219 | A | 12/1977 | Yamashita et al. |
| 4,121,945 | A | 10/1978 | Hurst et al. |
| 4,304,659 | A | 12/1981 | Pratt et al. |
| 4,325,833 | A | 4/1982 | Scott |
| 4,341,623 | A | 7/1982 | Bertolacini et al. |
| 4,705,409 | A | 11/1987 | Trerice |
| 4,911,900 | A | 3/1990 | Horch et al. |

(Continued)

FOREIGN PATENT DOCUMENTS

| DE | 26 11 213 A | 3/1976 |
| DE | 35 26 756 A1 | 7/1985 |

(Continued)

OTHER PUBLICATIONS

Hwang et al., "Utilization of Low NOx Coal Combustion By-Products", Institute of Materials Processing, Michigan Technological University, DE-FC21-94MC31174-11:1-102, (1998).

(Continued)

*Primary Examiner* — Robert A Hopkins
(74) *Attorney, Agent, or Firm* — Jenkins, Wilson, Taylor & Hunt, P.A.

(57) ABSTRACT

A mercury removal system and methods thereof include at least one supply system, at least one cooling system and at least one separation system. The supply system is connected to introduce at least beneficiated fly ash particles into an exhaust stream. The exhaust stream comprises at least one exhaust gas and mercury and at least a portion of the mercury in the exhaust stream adheres to the introduced beneficiated fly ash particles. The cooling system cools the exhaust stream before or after the connection of the supply system to the exhaust stream. The separation system separates from the exhaust stream and outputs at least a portion of the introduced beneficiated fly ash particles with the adhered mercury.

24 Claims, 1 Drawing Sheet

(56) References Cited

U.S. PATENT DOCUMENTS

| | | | |
|---|---|---|---|
| 4,959,334 A | 9/1990 | Mauleon et al. | |
| 5,051,245 A | 9/1991 | Wilson et al. | |
| 5,066,627 A | 11/1991 | Owen et al. | |
| 5,069,720 A | 12/1991 | Epperly et al. | |
| 5,160,539 A | 11/1992 | Cochran | |
| 5,273,727 A | 12/1993 | Johnson | |
| 5,399,194 A | 3/1995 | Cochran et al. | |
| 5,525,317 A | 6/1996 | Bhat et al. | |
| 6,077,494 A | 6/2000 | Gasiorowski et al. | |
| 6,290,066 B1 | 9/2001 | Hwang | |
| 6,422,392 B1 | 7/2002 | Levy | |
| 6,605,263 B2 | 8/2003 | Alix et al. | |
| 6,746,654 B2 | 6/2004 | Mehta et al. | |
| 6,755,901 B1 | 6/2004 | Ramme et al. | |
| 6,783,585 B2 | 8/2004 | Zacarias et al. | |
| 6,790,264 B2 | 9/2004 | Minkara | |
| 6,863,875 B1 | 3/2005 | Kotake et al. | |
| 6,981,456 B2 | 1/2006 | Lissianski et al. | |
| 7,223,375 B1 | 5/2007 | Cochran et al. | |
| 2002/0189497 A1 | 12/2002 | Tranquilla | |
| 2003/0202927 A1 | 10/2003 | Minkara et al. | |
| 2004/0033184 A1 | 2/2004 | Greer | |
| 2004/0069186 A1 | 4/2004 | Zacarias et al. | |
| 2007/0179056 A1* | 8/2007 | Baek et al. | 502/400 |
| 2007/0193476 A1 | 8/2007 | Cochran et al. | |

FOREIGN PATENT DOCUMENTS

| | | |
|---|---|---|
| DE | 38 02 844 A1 | 11/1987 |
| EP | 0 227 196 B1 | 1/1987 |
| JP | 57053224 A * | 3/1982 |
| JP | 59059237 A | 4/1984 |
| SU | 734162 | 5/1978 |

OTHER PUBLICATIONS

Vincent M. Giampa, Ammonia Removal from Fly Ash by Carbon Burn-Out, 2000 Conference on Unburned Carbon on Utility Fly Ash, National Energy Technology Laboratory, Department of Energy, St. Petersburg, FL.

Vincent M. Giampa, Ammonia Removal from Coal Fly Ash by Carbon Burn-Out, 2001 Conference on Selective Catalytic Reduction (SCR) and Selective Non-Catalytic Reduction (SNCR) for NOx Control, National Energy Technology Laboratory, Department of Energy, St. Petersburg, FL.

Cheminfo: Ammonia Gas, Chemical Profiles Created by CCOHS, Canadian Centre for Occupational Health and Safety, www.worksafesask.ca/files/ccohs/cheminfo/cie48.html, printed Mar. 10, 2006.

Vincent M. Giampa, Ammonia Removal from Coal Fly Ash by Carbon Burn-Out, NETL Conference Proceedings, 2001, Pittsburg, PA, www.progressfuels.com/cbo/AmmoniaRemoval.html, printed Jun. 2, 2005.

W. Braker et al., Matheson Gas Products, Matheson Gas Data Book 6th Edition, 1980, pp. 23-29.

Compressed Gas Association, Handbook of Compressed Gases 3Rd Edition, 1990, pp. 231-252, Van Nostrand Reinhold Co.

T.A. Czuppon et al., Ammonia, Kirk-Othmer Encyclopedia of Chemical Technology 4th Edition, 1992, pp. 678-710, vol. 2, John Wiley & Sons.

Kevin P. Resnik et al., Aqua Ammonia for Simultaneous Removal of $CO_2$, $SO_2$, and NO., Department of Energy, National Energy Technology Laboratory, Published: International Journal of Environmental Technology and Management, 2004, vol. 4 Nos. 1/2.

Frequently Asked Questions: American Coal Ash Association, website: www.acaa-usa.org/FAQ.htm, printed Jun. 1, 2005.

Ammonia, Environmental and Technical Information for Problem Spills, Jul. 1984, pp. 1-14, Technical Services Branch, Environmental Protection Service, Ottawa, ON, Canada.

Answer 296 of 406 of Chem Abstracts on STN, DE 3802884 (Hilgraf) Aug. 10, 1989 (abstract only).

Answer 327 of 406 of Chem Abstracts on STN, DE 3526756 (Ruetten et al.) Jan. 28, 1997 (abstract only).

"Combustion: Fossil Power Systems," published by Combustion Engineering, Inc., 3rd Edition, 1981, p. 24-22, 24-23.

"Treatment of Mercury in Fly Ash by the CBO Process," by Joe Cochran and Vincent Giampa, Research Disclosure Journal, Jun. 2003.

Kwon et al., "Characterization of Heavy Oil Fly Ash Generated From a Power Plant," AZojomo Journal of Materials Online, 1:1-8 (2005).

Answer 361 of 406 of Chem Abstracts on STN, JP 57053224 (Electric Power Dvlpmt) May 12, 1984 (abstract only).

ASTM C618-05, "Standard Specification for Coal Fly Ash and Raw of Calcined Natural Pozzolan for Use in Concrete," pp. 1-3, Jul. 1, 2005.

* cited by examiner

MERCURY REMOVAL SYSTEMS USING BENEFICIATED FLY ASH PARTICLES AND METHODS THEREOF

FIELD OF THE INVENTION

This invention generally relates to systems and methods for mercury removal from an exhaust stream and, more particularly, mercury removal systems using beneficiated fly ash particles and methods thereof.

BACKGROUND

Mercury as a trace element in coal becomes a contaminant in flue gas from coal-fired power plants and other coal fired furnaces. As a result, processes have been developed to capture mercury (Hg) contained in flue gas.

For example, one process that has been developed injects activated carbon into flue gas to absorb mercury. This process reports capture rates of up to about 90% of the total mercury contained in the coal. Unfortunately, activated carbon is expensive and thus its use for mercury removal adds significantly to overall costs.

In addition to the concerns of mercury in flue gas from coal-fired power plants, the presence of mercury on mixtures of fly ash particles and activated carbon slated for disposal has also been a significant regulatory concern because of the potential for ground water and surface water contamination.

Fly ash without activated carbon may be used as a partial replacement for Portland cement in concrete if it meets certain specifications (such as those found in ASTM C618-05 "Standard Specification for Coal Fly Ash and Raw or Calcined Natural Pozzolan for Use in Concrete"). The most common reason fly ash without activated carbon cannot be used in concrete is excess unburned carbon content in the ash. Excess unburned carbon is not allowed because it absorbs additives used in concrete making and makes them ineffective. However, after addition of activated carbon for mercury capture, ash is generally unusable even if it meets the unburned carbon specifications. This is because the activated carbon absorbs the concrete additives to a much large degree than the unburned carbon normally found in fly ash.

Fly ash with excess unburned carbon or added activated carbon may be beneficiated to allow use in concrete by Carbon Burnout or other thermal fly ash beneficiation processes to substantially reduce the carbon content. Carbon Burn-Out technology is disclosed in U.S. Pat. No. 5,160,539 and U.S. Pat. No. 5,399,194, which are both herein incorporated by reference in their entirety. Thermal beneficiation processes such as Carbon Burn-Out are known to preferentially combust the most adsorptive carbon particles (typically those with high surface areas such as activated carbon injected for mercury capture).

As disclosed in "Treatment of Mercury in Fly Ash by the CBO™ Process," by Joe Cochran and Vincent Giampa, Research Disclosure Journal, June of 2003, which is herein incorporated by reference in its entirety, carbon burn-out technology can be configured for two different mercury treatment configurations.

With respect to the first configuration, the high carbon fly ash particles are conveyed from a silo to a fluid bed combustor where a fan provides fluidization and combustion air to the fluid bed combustor. "Fly ash particles" as used herein means the combination of the mineral portion of the fly ash plus unburned carbon which may be attached to or separate from the mineral portion as well as any activated carbon or other particulate additive which has become part of the fly ash. In the fluid bed combustor, carbon in the fly ash particles combusts on a continuous basis and the product fly ash particles and flue gas exit the fluid bed combustor with the mercury vaporized in the flue gas so that the beneficiated fly ash particles are essentially mercury free. The beneficiated fly ash particles and flue gas are cooled by heat exchange with condensate of the power plant (or other heat exchange medium) to temperatures between 300° F. and 550° F. During cooling, the volatized mercury which initially was with the fly ash particles is no longer vaporized and returns back to the beneficiated fly ash particles. These cooled beneficiated fly ash particles are separated from the flue gas, which is now essentially mercury free, by a cyclone and a baghouse (or particulate separation devices of similar function). The separated, beneficiated fly ash particles with the mercury are conveyed to a storage and load-out area for use as a direct replacement for Portland cement. After use of the beneficiated fly ash particles in concrete, the mercury is substantially sequestered within the concrete matrix.

With respect to the second configuration, the exhaust with the vaporized mercury which leaves the fluid bed combustor is processed. Two options exist for processing this exhaust to remove the mercury.

With the first option, the exhaust is cooled to a suitable temperature well below the condensation temperature of mercury, such as between 300° F. and 550° F., to a temperature suitable for passing through a conventional baghouse. The mercury is condensed or absorbed on the small mass of unbeneficiated fly ash particles. These unbeneficiated fly ash particles elutriated from the fluid bed combustor have a high carbon content of 25% to 50% which is believed in the prior art to aid in mercury capture, similar to the use of activated carbon. Next, these unbeneficiated fly ash particles containing mercury are forwarded to a mercury recovery process and the cleaned exhaust gas can be used for other operations.

With the second option, the exhaust is cooled to the lowest temperature at which substantially all the mercury remains in the gas phase which is about 1100° F. and then the elutriated fly ash particles are separated in a high temperature baghouse or other particulate capture device of similar purpose. The separated fly ash particles are returned to the fluid bed for further carbon reduction while the flue gas containing the vaporized mercury is forwarded to an on-site mercury recovery process. After removal of mercury, with for example activated carbon, the flue gas may be returned for other operations.

The first configuration described above discloses that mercury which was initially in the fly ash particles is not lost and ultimately remains with the beneficiated fly ash particles after the carbon burn-out process. The second configuration describes a first option where vaporized mercury is condensed or absorbed on high carbon content, unbeneficiated fly ash particles and a second option where the vaporized mercury is separated from the fly ash particles and is forwarded to a mercury recovery process.

Accordingly, it is known that mercury may be captured from the boiler exhaust gas by injection of activated carbon. Additionally, it is known that mercury initially in unbeneficiated fly ash particles which are subjected to carbon burnout or other thermal fly ash beneficiation processes will ultimately remain with the beneficiated particles. Further it is known that during the thermal fly ash beneficiation processes, the vaporized mercury can be condensed or absorbed on unbeneficiated fly ash particles having a high carbon content of 25% to 50% or the flue gas with the vaporized mercury can be separated from the fly ash particles for a subsequent mercury removal process.

As a result, even with thermal fly ash beneficiation processes, the prior art teaches that to remove mercury from exhaust, if material is added to exhaust gases to capture mercury that material needs to have high carbon content. Unfortunately, the use of activated carbon to capture mercury is expensive and its addition in fly ash requires additional thermal beneficiation to makes the resulting fly ash usable. Accordingly, there is clearly a need not taught or suggested by the known prior art discussed herein for an effective and low cost alternative for capturing new mercury emissions in exhaust streams from coal fired burners and boilers.

SUMMARY

A mercury removal system in accordance with embodiments of the present invention includes at least one supply system, at least one cooling system and at least one separation system. The supply system is connected to introduce at least beneficiated fly ash particles into an exhaust stream. The exhaust stream comprises at least one exhaust gas and mercury and at least a portion of the mercury in the exhaust stream adheres to the introduced beneficiated fly ash particles. The cooling system cools the exhaust stream before or after the introduction of the beneficiated fly ash particles by the supply system to the exhaust stream. The separation system separates from the exhaust stream and outputs at least a portion of the introduced beneficiated fly ash particles with the adhered mercury.

A method for making a mercury removal system in accordance with other embodiments of the present invention includes connecting at least one supply system to introduce at least beneficiated fly ash particles into an exhaust stream. The exhaust stream comprises at least one exhaust gas and mercury and at least a portion of the mercury in the exhaust stream adheres to the introduced beneficiated fly ash particles. At least one cooling system cools the exhaust stream before or after the introduction of the beneficiated fly ash particles by the supply system to the exhaust stream. The separation system is connected to separate from the exhaust stream and output at least a portion of the introduced beneficiated fly ash particles with the adhered mercury.

A method for controlling mercury emissions in accordance with other embodiments of the present invention includes introducing at least beneficiated fly ash particles into an exhaust stream. The exhaust stream comprises at least one exhaust gas and mercury and at least a portion of the mercury in the exhaust stream adheres to the introduced beneficiated fly ash particles. The exhaust stream is cooled before or after the introduction of the beneficiated fly ash particles to the exhaust stream. At least a portion of the introduced beneficiated fly ash particles with the adhered mercury are separated from the exhaust stream and output.

The present invention provides a number of advantages including providing an effective and less expensive system and method for introducing a material or materials to capture mercury in an exhaust stream. With the present invention, mercury in the exhaust steam or flue gas directly from a coal fired burner, such as a power plant boiler, or other furnace, can be captured with introduced beneficiated fly ash particles. These introduced, beneficiated fly ash particles are less expensive than activated carbon and provide the unpredictable result of being highly effective in capturing mercury when introduced despite their low carbon content, e.g. below about three percent. Since they become combined with any fly ash particles entering with the exhaust stream, the combined carbon content of the fly ash particles will determine whether the combined fly ash stream requires further processing in the fly ash thermal beneficiation process to reduce carbon content before being put to other beneficial uses with the captured mercury, such as a direct replacement for Portland cement.

DETAILED DESCRIPTION

Figure 1:
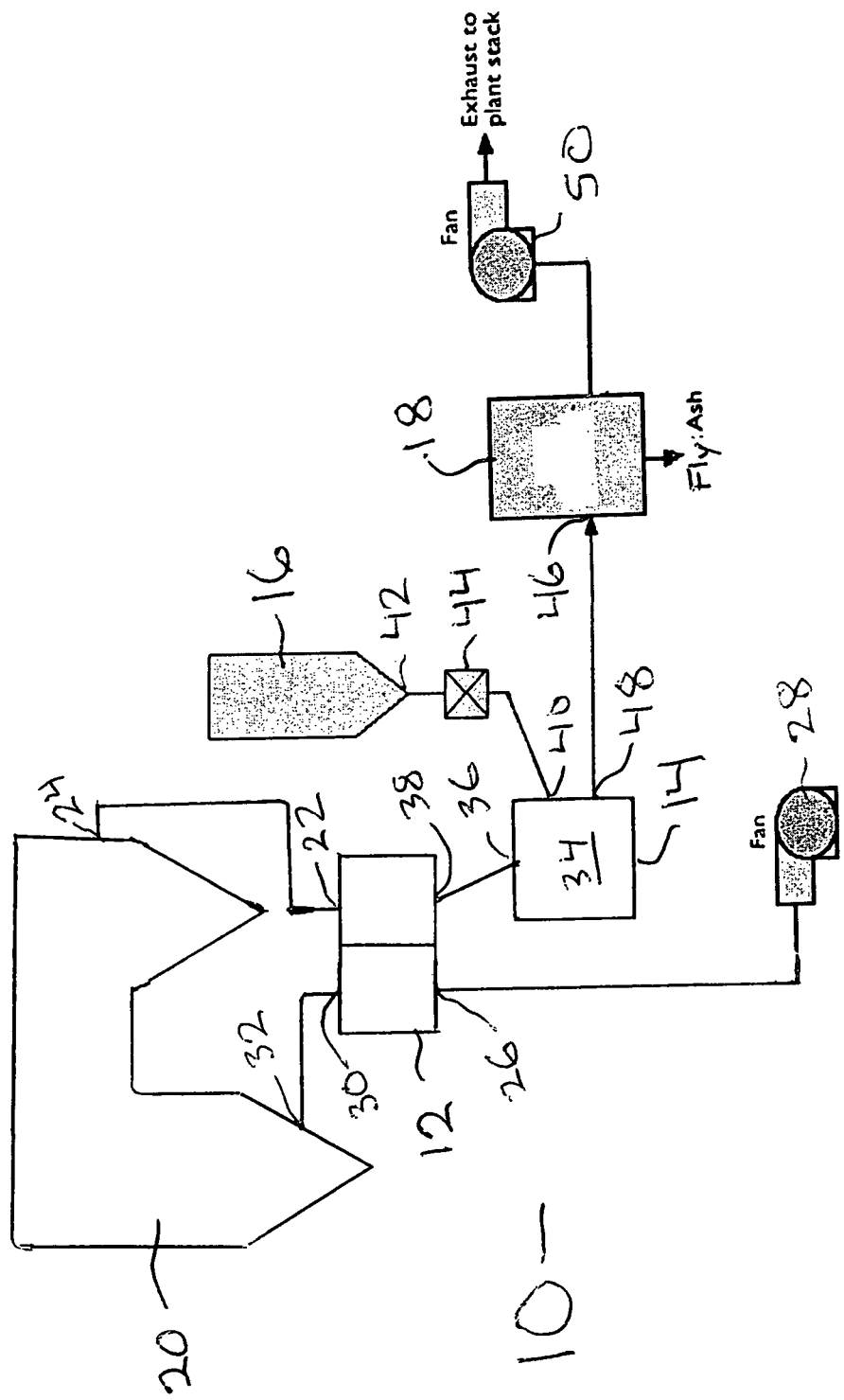
FIG. 1 is a block diagram of a mercury removal system using beneficiated fly ash particles in accordance with embodiments of the present invention.

A mercury removal system 10 in accordance with embodiments of the present invention is illustrated in FIG. 1. The mercury removal system 10 includes a cooling system 12, a reactor 14, a supply system 16 of beneficiated fly ash particles, and a separation system 18, although the mercury removal system 10 can comprise other numbers and types of components in other configurations. The present invention provides an effective and less expensive system and method for introducing a material or materials to capture mercury in an exhaust stream.

Referring more specifically to FIG. 1, in this particular embodiment a coal fired power plant boiler 20 is connected to the cooling system 12 to supply the exhaust stream, although other sources for the exhaust stream, such as a coal fired industrial furnace, can be used. In this particular embodiment, the cooling system 12 is an air pre-heater, although other types of cooling systems can be used. The exhaust stream comprises one or more exhaust gases, vaporized mercury, and unbeneficiated exhaust fly ash particles, although the exhaust stream could comprise other numbers and types of elements.

The cooling system 12 has an input 22 connected to an output 24 of the coal fired boiler 20 to receive the exhaust stream, although other numbers and types of connections can be used. The cooling system 12 also has an input 26 connected to a fan 28 which directs air into the cooling system 12 for the heat exchange process with the exhaust stream, although other types of fluids for cooling could be introduced into or could be resident in the cooling system 12 and other types of cooling systems could be used. In this particular embodiment, the fan 28 is a Forced Draft or FD Fan, although other types of circulation systems can be used. Further, the cooling system 12 has an output 30 which is connected to an input 32 of the coal fired burner 20 to direct a portion of the air which has been heated during the heat exchange process, although the output 30 could be directed to other locations. The cooling system 12 cools the exhaust stream to a temperature below where a large fraction of the vaporized mercury remains in a gaseous state, which is typically around 1100° F., although the exhaust stream could be cooled to other temperatures.

The reactor 14 has a chamber 34 with an input 36 connected to an output 38 of the cooling system 12 to receive the cooled exhaust stream, although other numbers and types of connections can be used. Additionally, the chamber 34 of the reactor 14 has an input 40 which is connected through a feed system 44 to an output 42 of the supply system 16 of the beneficiated fly ash particles, although other numbers and types of connections can be used such as multiple feed points to better distribute the beneficiated ash particles into the exhaust stream. With the mercury in the exhaust stream cooled to a temperature below where it remains in the gaseous state and with the introduction of the introduced beneficiated fly ash particles, the mercury in the exhaust stream adheres to the introduced beneficiated fly ash particles and also, to some extent, to any unbeneficiated exhaust fly ash particles from the coal fired boiler 20 which are in the chamber 34 of reactor 14. As a result, a substantial portion of the mercury in the exhaust stream is removed. In this particular embodiment, substantially all of the mercury in the exhaust stream from the coal fired boiler 20 is captured, although other percentages of the mercury could be captured depending on the particular application, such as about 70% or more of the mercury in the exhaust stream.

The introduced beneficiated fly ash particles which are introduced in the chamber 34 have previously been processed to reduce their carbon content to a level where they are suitable for use as a partial replacement for Portland cement. In this particular embodiment, the introduced beneficiated fly ash particles have a low carbon content which is at or below 3%, although the beneficiated fly ash particles could have other percentages of carbon. Since the processes for thermally beneficiating fly ash particles by oxidizing carbon therein so as to reduce the carbon content to acceptable levels are well known to those of ordinary skill in the art, they will not be described herein. By way of example only, two such methods for beneficiating fly ash particles are disclosed in U.S. Pat. No. 5,160,539 and in U.S. Pat. No. 5,399,194, which are both herein incorporated by reference in their entirety. As discussed earlier in the background, the prior art teaches the injection of activated carbon into exhaust gas from a coal fired boiler to capture mercury. As a result, the successful use of a material with low, if any remaining carbon content, such as introduced beneficiated fly ash particles, to capture mercury would not be predictable from this teaching in the prior art.

The supply system 16 provides the introduced beneficiated fly ash particles to the chamber 34 in the reactor to capture the mercury in the exhaust stream, although other sources for the beneficiated fly ash particles could be used. Additionally, the supply system 16 may supply other mercury capturing materials, such as activated carbon, with the beneficiated fly ash particles to the chamber 34 in reactor 14 to assist in the capture of mercury. A feed system 44 is connected between the supply system 16 and the inlet 40 to the chamber 34 to control the rate at which beneficiated fly ash particles are introduced into the chamber 34, although other manners for controlling the rate at which beneficiated fly ash particles are introduced and other numbers and types of connections could be used.

Although in this example, the introduced beneficiated ash particles are introduced from the supply system 16 into the chamber 34 of the reactor 14, the introduced beneficiated ash particles can be introduced at other locations in the system 10. For example, the introduced beneficiated ash particles could be introduced at a location between boiler 20 and cooling system 12. In this particular example, this introduction point for the introduced beneficiated ash particles upstream of the cooling system 12 results in the introduced beneficiated fly ash particles becoming well mixed with the exhaust stream before entering the chamber 34 of reactor 14.

In this particular embodiment, the separation system 18 is an electrostatic precipitator, although other types of separation systems can be used, such as a baghouse. The separation system 18 has an input 46 connected to an output 48 of the chamber 34 in the reactor 14 to receive the exhaust stream with a large fraction of the mercury adhered to the beneficiated fly ash particles, although other types and number of connections could be used. The separation system 18 separates both the beneficiated fly ash particles with the captured mercury and any other particles such as unbeneficiated fly ash particles or activated carbon particles with captured mercury entering with the exhaust gas from the remaining gases in the exhaust stream, outputs the separated beneficiated and non-beneficiated fly ash particles with the captured mercury, and exhausts the remaining gases in the exhaust stream with the assistance of the fan system 50. In this particular embodiment, the fan system 50 is an Induced Draft or ID Fan in a coal fired power plant, although other types of circulation systems could be used.

The operation of the mercury removal system 10 will now be described with reference to FIG. 1. Coal is combusted in the coal fired boiler 20 and generates an exhaust stream comprising at least one exhaust gas, vaporized mercury, and unbeneficiated fly ash particles, although other types of exhaust streams can be generated. The exhaust stream is directed from the output 24 in the coal fired burner 20 to the input 22 to the cooling system 12.

The cooling system 12 receives the exhaust stream of at least one exhaust gas, the vaporized mercury, and unbeneficiated fly ash particles along with air from fan 28 which is introduced via the inlet 26 to the cooling system 12, although other types and numbers of connection and other types and numbers of fluids for cooling could be introduced. The cooling system 12 cools the exhaust stream with a heat exchange process between the exhaust stream and the introduced air, although other manners for cooling the exhaust stream and other fluids could be used. In this particular embodiment, the cooling system 12 cools the exhaust stream to about 250-350° F. which is a temperature well below where the vaporized mercury remains in a gaseous state, which is typically around 1100° F., although the exhaust stream could be cooled to other temperatures. The heated air from the heat exchange process in the cooling system 12 is directed from the outlet 30 in the cooling system 12 to the input 32 in the coal fired boiler 20, although the heated air could be directed to other locations.

The cooled exhaust stream is directed from the outlet 38 in the cooling system 12 to the inlet 36 to the chamber 34 in the reactor 14 along with beneficiated fly ash particles which are directed into the chamber 34 via inlet 40 from the output 42 of the supply system 16, although other numbers and types of connections can be used. The feed system 44 can be adjusted to control the rate at which beneficiated fly ash particles are introduced into the chamber 34, although other manners for controlling the rate at which beneficiated fly ash particles are introduced could be used. Additionally, other mercury capturing materials, such as activated carbon, may be introduced with the beneficiated fly ash particles into the chamber 34 in reactor 14 to assist in the capture of mercury.

With the mercury in the exhaust stream cooled to a temperature below where it remains in the gaseous state and with the introduction of the beneficiated fly ash particles in the chamber 34, a substantial portion of the mercury in the exhaust stream adheres to the beneficiated fly ash particles in the chamber 34. In this particular embodiment, substantially all of the mercury in the exhaust stream from the coal fired boiler 20 is captured, although other percentages of the mercury could be captured depending on the particular application, such as about 70% or more of the mercury in the exhaust stream.

Next, the exhaust stream with substantially all of the mercury adhered to the beneficiated fly ash particles and any unbeneficiated fly ash particles and/or activated carbon particles which have been added is directed from the output 48 of chamber 34 to the input 46 of the separation system 18, although other types and number of connections could be used. Next, both the beneficiated fly ash particles with the captured mercury and any unbeneficiated fly ash particles and/or activated carbon particles with any captured mercury are separated from the remaining gases in the exhaust stream and are output by the separation system 18, although other manners for separating out the separated beneficiated fly ash particles with the captured mercury and any unbeneficiated fly ash particles and/or activated carbon particles with any captured mercury can be used. Additionally, the remaining gases in the exhaust stream in the separation system 18 are drawn out with assistance of the fan system 50, although other manners for drawing out the remaining gases in the exhaust stream can be used.

Accordingly, as illustrated by the discussion herein the present invention provides an effective and less expensive system and method for capturing mercury in an exhaust stream from coal fried burner, such as a power plant boiler, industrial boiler or other coal fired furnace. With the present invention, a substantial portion of the mercury in the exhaust stream or flue gas directly from a coal fired burner can be captured with newly introduced beneficiated fly ash particles. These introduced beneficiated fly ash particles are less expensive than activated carbon and do not require further processing to reduce carbon content before being put to other beneficial uses with the captured mercury, such as a direct replacement for Portland cement. However, if any non-beneficiated exhaust fly ash particles have a high carbon content, the combined fly ash stream may require further processing before such use.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A mercury removal system comprising:
    at least one supply system connected to introduce at least carbon burnout beneficiated fly ash particles into an exhaust stream, the introduced beneficiated fly ash particles have a carbon content of about 3% or less, the exhaust stream comprises at least one exhaust gas and mercury and at least a portion of the mercury in the exhaust stream adheres to the introduced beneficiated fly ash particles;
    at least one cooling system that cools the exhaust stream; and
    at least one separation system that separates from the exhaust stream and outputs at least a portion of the introduced beneficiated fly ash particles with the adhered mercury.

2. The system as set forth in claim 1 further comprising at least one reactor with a chamber connected to the cooling system to receive the cooled exhaust stream and connected to the supply system to receive the introduced beneficiated fly ash particles in the chamber of the reactor.

3. The system as set forth in claim 1 further comprising at least one metering device that controls a feed rate of the introduced beneficiated fly ash particles.

4. The system as set forth in claim 1 further comprising at least one coal fired burner which supplies the exhaust stream connected to the cooling system.

5. The system as set forth in claim 1 wherein the supply system supplies activated carbon in addition to the introduced beneficiated fly ash particles, wherein at least a portion of the mercury in the exhaust stream adheres to the activated carbon.

6. The system as set forth in claim 1 wherein the exhaust stream further comprises unbeneficiated exhaust fly ash particles and at least a portion of the mercury in the exhaust stream adheres to the unbeneficiated exhaust fly ash particles.

7. The system as set forth in claim 1 wherein the cooling system cools the exhaust stream to a temperature below where the mercury remains in a gaseous state.

8. The system as set forth in claim 1 wherein at least 70% of the mercury in the exhaust stream is separated from the exhaust stream.

9. A method for making a mercury removal system, the method comprising:
    connecting at least one supply system to introduce at least carbon burnout beneficiated fly ash particles into an exhaust stream, the introduced beneficiated fly ash particles have a carbon content of about 3% or less, the exhaust stream comprises at least one exhaust gas and mercury and at least a portion of the mercury in the exhaust stream adheres to the introduced beneficiated fly ash particles;
    connecting at least one cooling system that cools the exhaust stream; and
    connecting at least one separation system to separate from the exhaust stream and output at least a portion of the introduced beneficiated fly ash particles with the adhered mercury.

10. The method as set forth in claim 9 further comprising connecting at least one reactor with a chamber to the cooling system to receive the cooled exhaust stream and to the supply system to receive the introduced beneficiated fly ash particles in the chamber of the reactor.

11. The method as set forth in claim 9 further comprising connecting at least one metering device to control a feed rate of the introduced beneficiated fly ash particles.

12. The method as set forth in claim 9 further comprising connecting at least one coal fired burner which supplies the exhaust stream to the cooling system.

13. The method as set forth in claim 9 wherein the supply system is connected to supply activated carbon in addition to the introduced beneficiated fly ash particles, wherein at least a portion of the mercury in the exhaust stream adheres to the activated carbon.

14. The method as set forth in claim 9 wherein the supply system is connected to an exhaust stream which further comprises unbeneficiated exhaust fly ash particles and at least a portion of the mercury in the exhaust stream adheres to the unbeneficiated exhaust fly ash particles.

15. The method as set forth in claim 9 wherein the cooling system is set to cool the exhaust stream to a temperature below where the mercury remains in a gaseous state.

16. The method as set forth in claim 9 wherein the supply system is set to introduce the beneficiated fly ash particles so at least 70% of the mercury in the exhaust stream is separated from the exhaust stream.

17. A method for controlling mercury emissions, the method comprising:
    introducing at least carbon burnout beneficiated fly ash particles into an exhaust stream, the introduced beneficiated fly ash particles have a carbon content of about 3% or less, the exhaust stream comprises at least one exhaust gas and mercury and at least a portion of the mercury in the exhaust stream adheres to the introduced beneficiated fly ash particles;

cooling the exhaust stream; and separating from the exhaust stream and outputting at least a portion of the introduced beneficiated fly ash particles with the adhered mercury.

18. The method as set forth in claim 17 further comprising receiving the cooled exhaust stream and the introduced beneficiated fly ash particles in at least one chamber of at least one reactor.

19. The method as set forth in claim 17 further comprising controlling a feed rate of the introduced beneficiated fly ash particles.

20. The method as set forth in claim 17 further comprising supplying the exhaust stream to the cooling system from at least one coal fired burner.

21. The method as set forth in claim 17 wherein the introducing at least beneficiated fly ash particles further comprises introducing activated carbon in addition to the introduced beneficiated fly ash particles, wherein at least a portion of the mercury in the exhaust stream adheres to the activated carbon.

22. The method as set forth in claim 17 wherein the introducing at least beneficiated fly ash particles further comprises introducing the at least beneficiated fly ash particles into the exhaust stream that further comprises unbeneficiated exhaust fly ash particles, wherein at least a portion of the mercury in the exhaust stream adheres to the unbeneficiated exhaust fly ash particles.

23. The method as set forth in claim 17 wherein the cooling the exhaust stream cools the exhaust stream to a temperature below where the mercury remains in a gaseous state.

24. The method as set forth in claim 17 wherein the introducing at least beneficiated fly ash particles introduces beneficiated fly ash particles so at least 70% of the mercury in the exhaust stream is separated from the exhaust stream.

* * * * *